US012566547B2

(12) United States Patent
Zhou et al.

(10) Patent No.: US 12,566,547 B2
(45) Date of Patent: Mar. 3, 2026

(54) HYBRID DESIGN FOR LARGE SCALE BLOCK DEVICE COMPRESSION USING FLAT HASH TABLE

(71) Applicant: Lemon Inc., Grand Cayman (KY)

(72) Inventors: Ping Zhou, Los Angeles, CA (US); Longxiao Li, Los Angeles, CA (US); Chaohong Hu, Los Angeles, CA (US); Fei Liu, Los Angeles, CA (US); Kan Frankie Fan, Los Angeles, CA (US); Hui Zhang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 322 days.

(21) Appl. No.: 18/056,842

(22) Filed: Nov. 18, 2022

(65) Prior Publication Data

US 2024/0168630 A1     May 23, 2024

(51) Int. Cl.
G06F 3/06 (2006.01)

(52) U.S. Cl.
CPC .......... G06F 3/0608 (2013.01); G06F 3/0631 (2013.01); G06F 3/064 (2013.01); G06F 3/0673 (2013.01)

(58) Field of Classification Search
None
See application file for complete search history.

(56) References Cited

U.S. PATENT DOCUMENTS

| 7,676,628 | B1 * | 3/2010 | Compton | .............. | G06F 3/0665 |
| | | | | | 711/202 |
| 8,473,566 | B1 * | 6/2013 | Cardente | .............. | G06F 3/0653 |
| | | | | | 709/215 |
| 9,858,290 | B1 * | 1/2018 | Bent | ..................... | G06F 16/188 |
| 2003/0110344 | A1 * | 6/2003 | Szczepanek | ........ | H04L 12/4625 |
| | | | | | 709/200 |
| 2005/0179201 | A1 * | 8/2005 | DeSalvo | ............. | A63F 3/00031 |
| | | | | | 273/244.1 |
| 2007/0179836 | A1 * | 8/2007 | Juang | ................. | G06Q 30/0254 |
| | | | | | 705/7.34 |
| 2008/0154654 | A1 * | 6/2008 | Niessen | ............. | G06Q 30/0241 |
| | | | | | 705/5 |

(Continued)

OTHER PUBLICATIONS

The extended European search report issued in European Application No. 23208304.8, dated Apr. 3, 2024.

*Primary Examiner* — Christopher D Birkhimer
(74) *Attorney, Agent, or Firm* — Fish & Richardson P.C.

(57) ABSTRACT
A flat hash table includes a plurality of entries, and each entry includes a hash function index and a usage bitmap. A method for block device level compression mapping using the flat hash table includes compressing uncompressed data to compressed data, retrieving an entry of the flat hash table using an uncompressed block address of the uncompressed data, determining a compressed block address of the compressed data by executing at least one hash function and by determining a hash function in the at least one hash function for mapping the uncompressed block address to the compressed block address that corresponds to a space in a block storage device, storing the compressed data to the space that corresponds to the compressed block address, and updating the hash function index of the entry of the flat hash table with an index indicative of the hash function.

19 Claims, 9 Drawing Sheets

(56)　　　References Cited

U.S. PATENT DOCUMENTS

| | | | |
|---|---|---|---|
| 2008/0172542 A1* | 7/2008 | Kaushik | G06F 3/0608 |
| | | | 711/202 |
| 2008/0243881 A1* | 10/2008 | Russo | G06F 16/9027 |
| 2010/0199042 A1* | 8/2010 | Bates | H04L 9/0625 |
| | | | 711/135 |
| 2011/0093437 A1* | 4/2011 | Sampathkumar | G06F 16/128 |
| | | | 707/649 |
| 2011/0258461 A1* | 10/2011 | Bates | G06F 11/1464 |
| | | | 711/135 |
| 2017/0060610 A1* | 3/2017 | Klee | G06F 3/067 |
| 2019/0065392 A1 | 2/2019 | Erez et al. | |
| 2020/0042612 A1 | 2/2020 | Kronrod et al. | |

* cited by examiner

700

HYBRID DESIGN FOR LARGE SCALE BLOCK DEVICE COMPRESSION USING FLAT HASH TABLE

FIELD

The embodiments described herein pertain generally to block device level compression mapping. More specifically, the embodiments described herein pertain to hybrid design for large scale block device level compression mapping using a flat hash table.

BACKGROUND

Block storage, or referred to as block-level storage, is a common form of storage that is used to store data in blocks e.g., on storage area networks, in cloud-based storage environments, etc. Each block may be stored as a separate piece with a unique identifier. Cloud-based block storage or storage device is a common product offered by cloud service providers (CSPs). In block storage or storage devices, transparent compression may be a desirable feature by which compression may be done at the block device level and the compression may be transparent to the host (e.g., a server running the user's applications), and no additional software change may be needed on the host. The mapping between the uncompressed block addresses and compressed block addresses need to be maintained and tracked carefully due to e.g., the non-linear mapping between the compressed address (i.e., the address for the block storage device) and the uncompressed address (i.e., the address presented to the host). Existing mappings either have a mapping table that may not be able to fit in the memory or may lead to extra latency and/or a low throughput.

SUMMARY

In one example embodiment, a flat hash table includes a plurality of entries, and each entry of the flat hash table includes a hash function index and a usage bitmap. A method for block device level compression mapping using the flat hash table includes compressing uncompressed data to compressed data; retrieving an entry of the flat hash table using an uncompressed block address of the uncompressed data; determining a compressed block address of the compressed data by: executing at least one hash function for mapping the uncompressed block address to the compressed block address, and determining a hash function in the at least one hash function for mapping the uncompressed block address to the compressed block address that corresponds to a space in a block storage device to store the compressed data; storing the compressed data to the space that corresponds to the compressed block address; and updating the hash function index of the entry of the flat hash table with an index indicative of the hash function.

In another example embodiment, a block storage device control system includes a flat hash table having a plurality of entries, and each entry of the flat hash table includes a hash function index and a usage bitmap. The system also includes a processor to compress uncompressed data to compressed data; retrieve an entry of the flat hash table using an uncompressed block address of the uncompressed data; determine a compressed block address of the compressed data by: executing at least one hash function for mapping the uncompressed block address to the compressed block address, and determining a hash function in the at least one hash function for mapping the uncompressed block address to the compressed block address that corresponds to a space in a block storage device to store the compressed data; store the compressed data to the space that corresponds to the compressed block address; and update the hash function index of the entry of the flat hash table with an index indicative of the hash function.

In yet another example embodiment, a non-transitory computer-readable medium has computer-executable instructions stored thereon that, upon execution, cause one or more processors to perform operations. The operations include compressing uncompressed data to compressed data; retrieving an entry of a flat hash table using an uncompressed block address of the uncompressed data; determining a compressed block address of the compressed data by: executing at least one hash function for mapping the uncompressed block address to the compressed block address, and determining a hash function in the at least one hash function for mapping the uncompressed block address to the compressed block address that corresponds to a space in a block storage device to store the compressed data; storing the compressed data to the space that corresponds to the compressed block address; and updating a hash function index of the entry of the flat hash table with an index indicative of the hash function.

It is to be understood that a "flat mapping table" scheme may be used for mapping and/or tracking the mappings from the uncompressed block addresses to the compressed block addresses. That is, the flat mapping table is addressed using the uncompressed block addresses. For example, the uncompressed block addresses are used as the index of the flat mapping table, and each entry of the flat mapping table contains the corresponding compressed block address for the block storage device. Using a flat mapping table scheme, assuming each four-kilobyte (KB) uncompressed address uses a 64-bit mapping entry, managing 64-terabyte (TB) storage space may require a flat mapping table having a size of 128-gigabyte (GB). Such a large flat mapping table may lead to performance issues since the flat mapping table may not be able to fit in the memory such as a dynamic random-access memory (DRAM) and may have to be stored on a disk (e.g., a storage device such as a block storage device, etc.), and almost each input/output (I/O) may require an extra read from the disk. Typically a 4 GB cache (for the mapping table) may cover 2 TB of storage space. If the storage space being managed (e.g., compressed, etc.) is 64 TB, then the hit rate of the cache may be about 3.1% (2/64) under the random I/O, and almost each I/O may require an extra read from disk. With the storage space growing larger (e.g. more disks are attached to the storage device), the hit rate of the cache may drop proportionally, leading to even worse performance.

It is also to be understood that a "hash table" mechanism or scheme may be used to map the uncompressed addresses to the compressed addresses. In such scheme, a hash table is used, and the hash table uses a single hash function (without configuration and/or having a single configuration) to map the uncompressed addresses to the compressed addresses. However, one hash function may not lead to a correct mapping. Multiple attempts may be needed to get the correct mapping, which may lead to extra latency and/or lower throughput.

Features in the embodiments disclosed herein may provide a hybrid architecture of a transparent block device level compression mapping using a flat hash table. Features in the embodiments disclosed herein may solve the major challenges of implementing a large scale transparent block device level compression mapping system: memory usage and performance.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
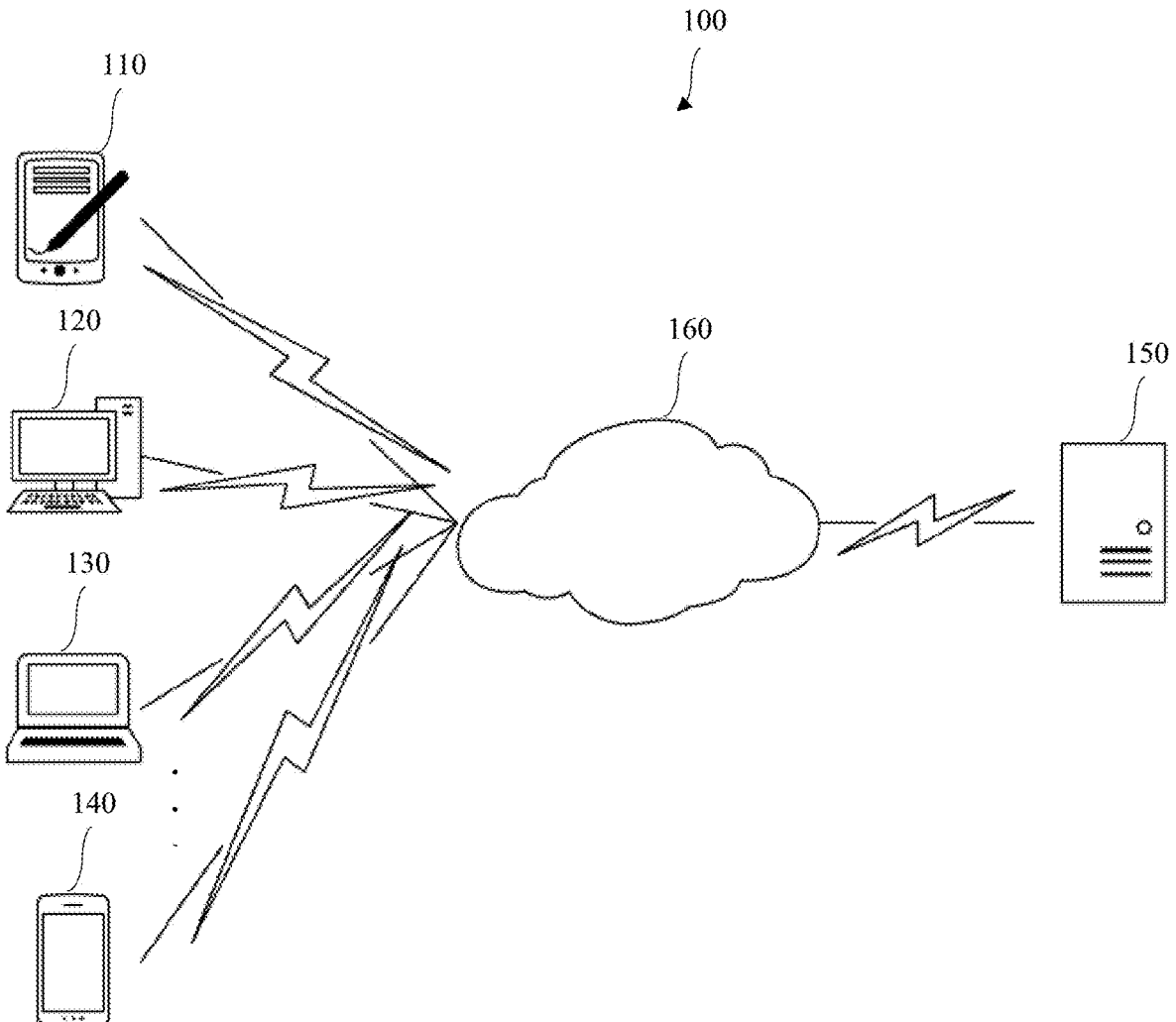
FIG. 1 is a schematic view of an example cloud-based block storage system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "block" in data storage may refer to a fixed-size amount of storage within a storage medium that is capable of storing a piece of data. It is to be understood that data may be stored in blocks, and each block may be assigned a unique address or identifier. In an example embodiment, the size of each block may be 4 KB. For example, in the embodiments described herein, the uncompressed block address (presented to and used by the host or application(s) running on the host) and/or the compressed block address (for a block storage device) may correspond to a space in a unit of a 4 KB block.

As referenced herein, "hash function" may refer to a function that converts an input (e.g., a numerical value) into an output (e.g., another numerical value). It is to be understood that a hash function is a term of art and may be used in data storage and/or retrieval application(s) to access data in a small and nearly constant time per retrieval.

As referenced herein, "metadata" may refer to data that provides information about other data, but not the content of the data. It is to be understood that metadata may be referred to as "data about data", i.e., data providing information about one or more aspects of other data. In some example embodiments, metadata may include time and date of creation, size of the data, source of the data, usage of data, linkage between two pieces of data, etc.

FIG. 1 is a schematic view of an example cloud-based block storage system 100, arranged in accordance with at least some embodiments described herein.

The system 100 may include terminal devices 110, 120, 130, and 140, a network 160, and a server (i.e., a host) 150. It is to be understood that FIG. 1 only shows illustrative numbers of the terminal devices, the network, and the server.

The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services, such as a server for providing cloud services (including e.g., cloud storage and/or retrieval service, etc.) to the users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications, such as social media applications or the like, may be installed on the terminal devices 110, 120, 130, and 140.

It is to be understood that software applications or services according to the embodiments described herein and/or according to the services provided by the cloud service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that in a case that a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
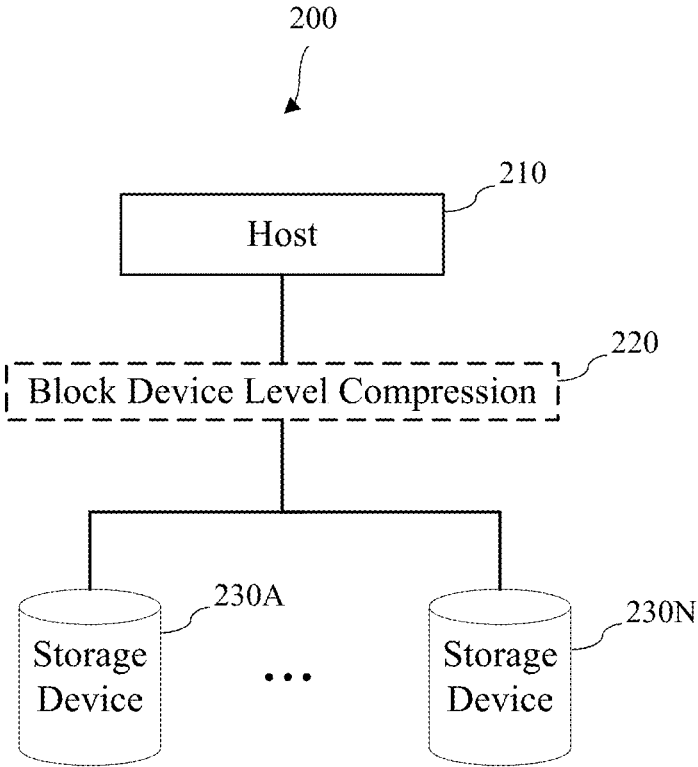
FIG. 2 is a schematic view of an example block storage device control system, arranged in accordance with at least some embodiments described herein.

FIG. 2 is a schematic view of an example block storage device control system 200, arranged in accordance with at least some embodiments described herein.

The system 200 includes a host 210, a block device level compression module 220, and one or more storage devices 230A-230N. In an example embodiment, the host 210 may be the server 150 of FIG. 1. The storage devices 230A-230N may be block storage devices. Uncompressed block addresses (and/or uncompressed data) may be presented to and/or accessible by the host 210, and the compressed data may be stored in a space corresponds to the compressed block addresses for the storage devices 230A-230N.

In an example embodiment, the operations of the block device level compression module 220 may be transparent to the host 210. That is, the host 210 operates, manipulates, reads, writes, stores, or otherwise accesses the uncompressed data (and/or the uncompressed block addresses) with the storage devices 230A-230N via the block device level compression module 220. The host 210 may not be aware of the block device level compression module 220 (1) compressing the uncompressed data to the compressed data, (2) mapping the uncompressed block address to a compressed block address, (3) storing the compressed data in a space corresponds to the compressed block addresses for the storage devices 230A-230N, (4) retrieving the compressed data from the storage devices 230A-230N, and/or (5) decompressing the compressed data to the uncompressed data.

For example, when the host 210 reads data from the storage devices 230A-230N, the host may receive the uncompressed data via the block device level compression module 220. When the host 210 writes data to the storage devices 230A-230N, the host 210 may send the uncompressed data to the block device level compression module 220.

In an example embodiment, the interface between the host 210 and the block device level compression module 220 and/or the interface between the storage devices 230A-230N and the block device level compression module 220 may be e.g., an interface that implements the nonvolatile memory express (NVMe) storage access and transport protocol. It is to be understood that the features of the embodiments disclosed herein may be implemented in the block device level compression module 220. In an example embodiment, the block device level compression module 220 may include one or more components of a computer system 700 (shown in FIG. 7, discussed below). In an example embodiment, the block device level compression module 220 may include the storage devices 230A-230N. In an example embodiment, the block device level compression module 220 may be in a form of a computer card or the like.

Figure 3A:
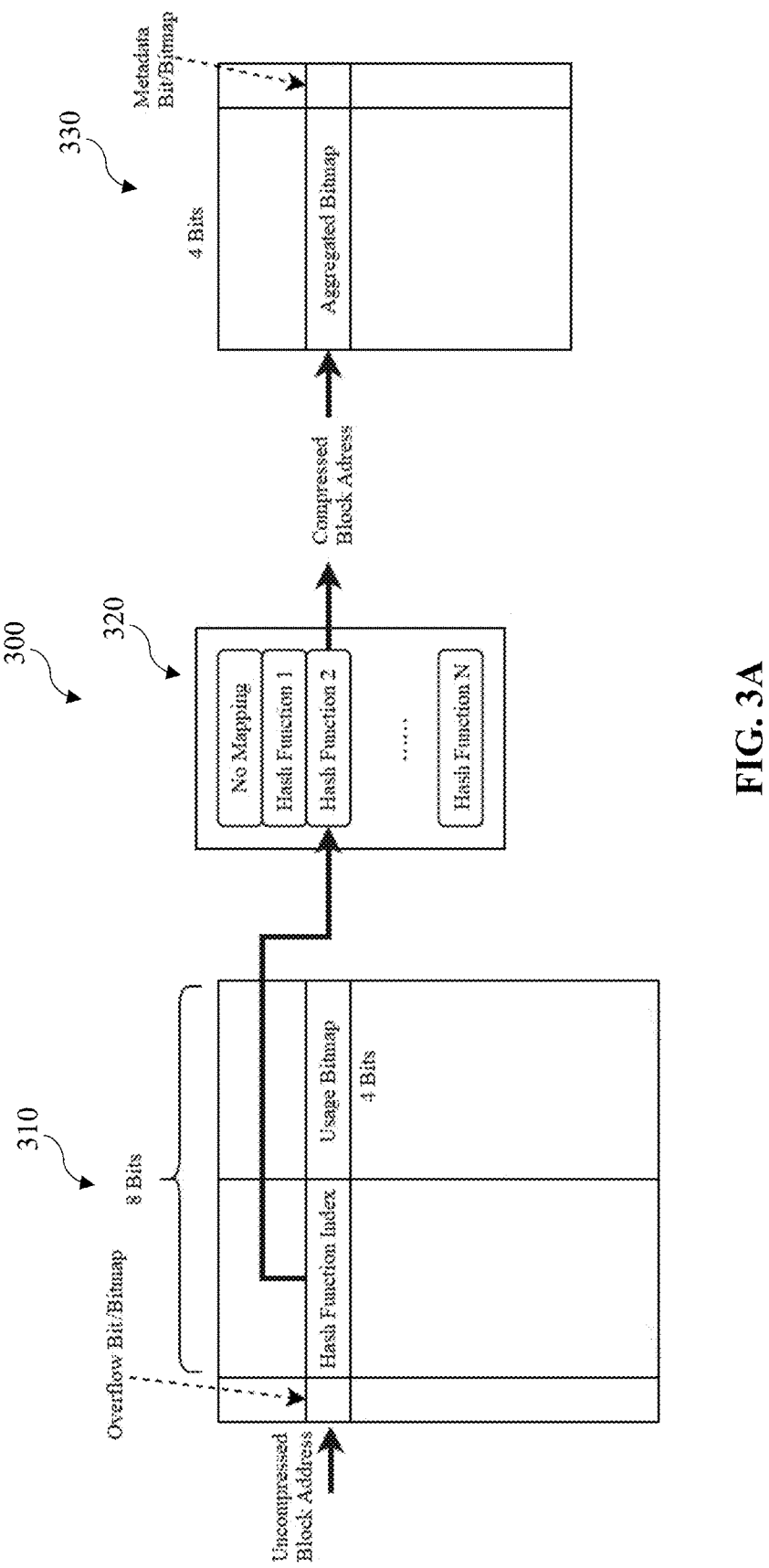
FIG. 3A is a schematic view of an example address mapping sub-system, arranged in accordance with at least some embodiments described herein.

FIG. 3A is a schematic view of an example address mapping sub-system 300, arranged in accordance with at least some embodiments described herein. In an example embodiment, the sub-system 300 may be a part of and/or accessible by the block device level compression module 220 of FIG. 2.

The sub-system 300 includes a flat hash table 310, a set of hash functions (or one hash function with multiple configurations, etc.) 320, and a compressed block allocation table 330. In an example embodiment, the flat hash table 310 and the compressed block allocation table 330 are in-memory tables. That is, the flat hash table 310 and the compressed block allocation table 330 are populated from the metadata on the block storage device and maintained in memory at runtime.

In an example embodiment, the flat hash table 310 may be indexed by the uncompressed block addresses of the uncompressed data that are presented to and/or accessible by the host 210 of FIG. 2. The flat hash table 310 may include a plurality of entries. The number of entries may be equal to the number of the uncompressed block addresses. That is, each uncompressed block address may correspond to an entry of the flat hash table 310. Each entry of the flat hash table 310 includes a hash function index field that contains a hash function index and a usage bitmap field that contains a usage bitmap. In an example embodiment, a size of the hash function index field is 4 bits. A size of the usage bitmap field is 4 bits. See FIG. 3B for the detailed description regarding the usage bitmap field.

It is to be understood that the hash function index indicates which hash function (in a set of hash functions) is used for mapping the uncompressed block address (which is used as the index of the entry of the flat hash table 310) to a compressed block address. If the hash function index is 0 or empty, no mapping is configured. In an example embodiment, up to 15 hash functions may be supported (when a size of the hash function index field is 4 bits).

It is also to be understood that a set of hash functions may be provided. In an example embodiment, the set of hash functions may be pre-defined. The set of hash functions may be provided by or implemented on hardware and/or software. In an example embodiment, the set of hash functions is implemented on a dedicated hardware (e.g., using a physical device and/or electronic circuit as opposed to being done by a computer program) to increase the speed and to lower the energy consumption compared with the software implementation. The set of hash functions may be implemented as (1) a set of different hash functions, or (2) by using one hash function with a plurality of (different) configurations, or (3) a combination of the two implementations. It is to be understood that the requirement for the set of hash functions is that the set of hash functions may generate different mappings from the uncompressed block address space to the compressed block address space. In some example embodiments, the set of hash functions may include a Pearson hashing/hash function, a Fowler-Noll-Vo hash function, and/or a PJW (Peter J. Weinberger) hash function.

It is further to be understood that the index of the set of hash functions may be used as the hash function index of the entry of the flat hash table 310. That is, the value of the hash function index in the flat hash table 310 may correspond to the index of the hash function in the set of hash functions (or the index of the configuration of the hash function in the multiple configurations if one hash function with multiple configurations is used). For example, when the hash function index is one, the first hash function in the set of hash functions (or the hash function with the first configuration) may be used for mapping. When the hash function index is two, the second hash function in the set of hash functions (or the hash function with the second configuration) may be used for mapping. When the hash function index is N, the Nth hash function in the set of hash functions (or the hash function with the Nth configuration) may be used for mapping. When a hash function is executed, the hash function may take the uncompressed block address (i.e., the index of the flat hash table 310 that corresponds to an entry of the flat hash table 310 that contains the hash function index that corresponds to the hash function) as an input, and map the input to an output (i.e., the compressed block address of the compressed data to be stored in the block storage device). It is to be understood that when the hash function index is zero, it indicates that there is no mapping.

Figure 6A:
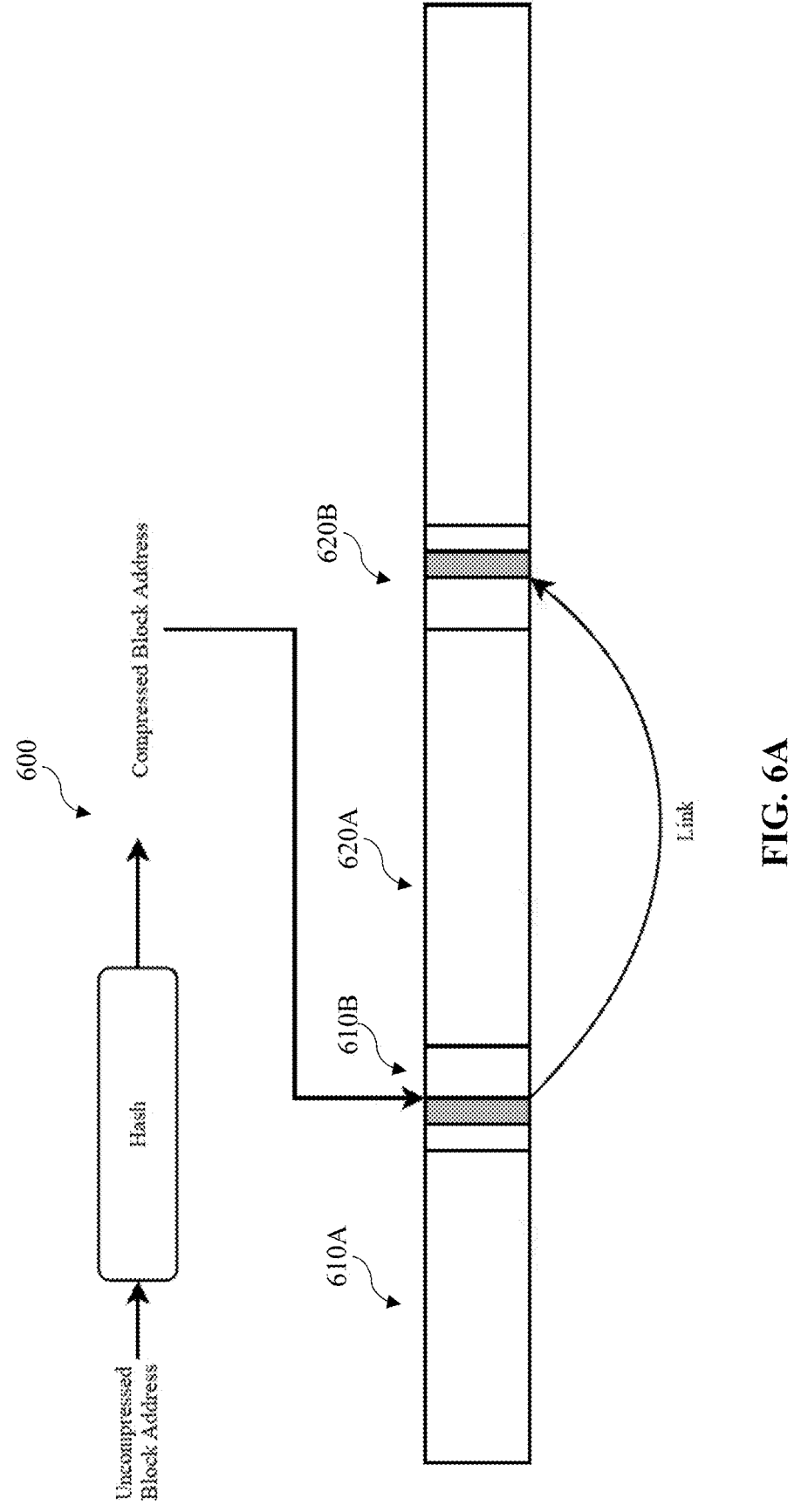
FIG. 6A is a schematic view of an example overflow handling mechanism, arranged in accordance with at least some embodiments described herein.
Figure 6B:
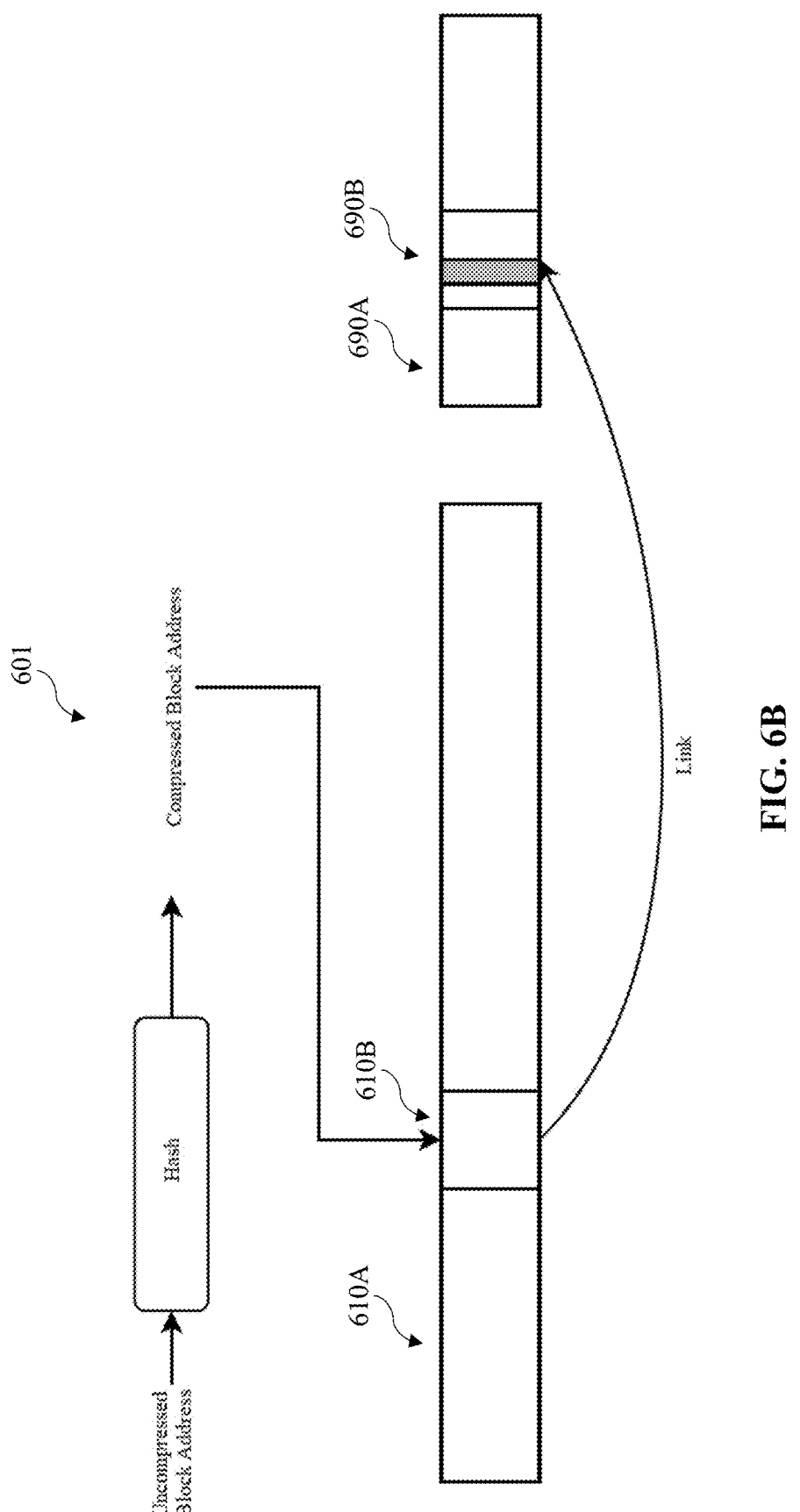
FIG. 6B is a schematic view of another example overflow handling mechanism, arranged in accordance with at least some embodiments described herein.

In an example embodiment, each entry of the flat hash table 310 may include an "overflow" bit indicating whether the storage is overflowed (which may be addressed by e.g., using compressed block address linking or using an overflow area or space, see descriptions of FIGS. 6A and 6B). In another example embodiment, an overflow bitmap separate from and/or independent to the flat hash table 310 may be used to track the status of the overflow. It is to be understood that a bitmap may refer to a representation in which each item corresponds to one or more bits of information.

In an example embodiment, the compressed block allocation table 330 may be indexed by the compressed block addresses for the block storage device. The compressed block allocation table 330 may include a plurality of entries. The number of entries is equal to the number of the compressed block addresses for the block storage device. That is, each compressed block address may correspond to an entry of the compressed block allocation table 330. Each entry of the compressed block allocation table 330 may include an aggregated bitmap field that contains an aggregated bitmap. As shown in FIG. 3A, in an example embodiment, a size of the aggregated bitmap field is 4 bits. See FIG. 3B for the detailed description regarding the aggregated bitmap field.

In an example embodiment, each entry of the compressed block allocation table 330 may include a "metadata" bit indicating whether there is metadata in a space corresponds to the compressed block address in the block storage device (e.g., to avoid or prevent unnecessary metadata reads, see descriptions of FIGS. 6A and 6B). In another example embodiment, a metadata bitmap (instead of a metadata bit) separate from and/or independent to the compressed block allocation table 330 may be used to track the status of the metadata. It is to be understood that a bitmap may refer to a representation in which each item corresponds to one or more bits of information.

In operation, address mapping from the uncompressed block address to a compressed block address includes (1) using the uncompressed block address as the index to locate and retrieve the corresponding entry in the flat hash table 310, (2) obtaining the hash function index in that entry of the flat hash table 310, (3) identifying the corresponding hash function (in the set of hash functions 320) using the hash function index, (4) executing or running the identified hash function, which uses the uncompressed block address as an input, to map the uncompressed block address to a compressed block address (e.g., generating the compressed block address by the hash function). It is to be understood that the above process may be partially or fully accelerated by hardware (e.g. by inputting the uncompressed block address and the hash function index to the hardware, and the hardware outputting the compressed block address).

Figure 3B:
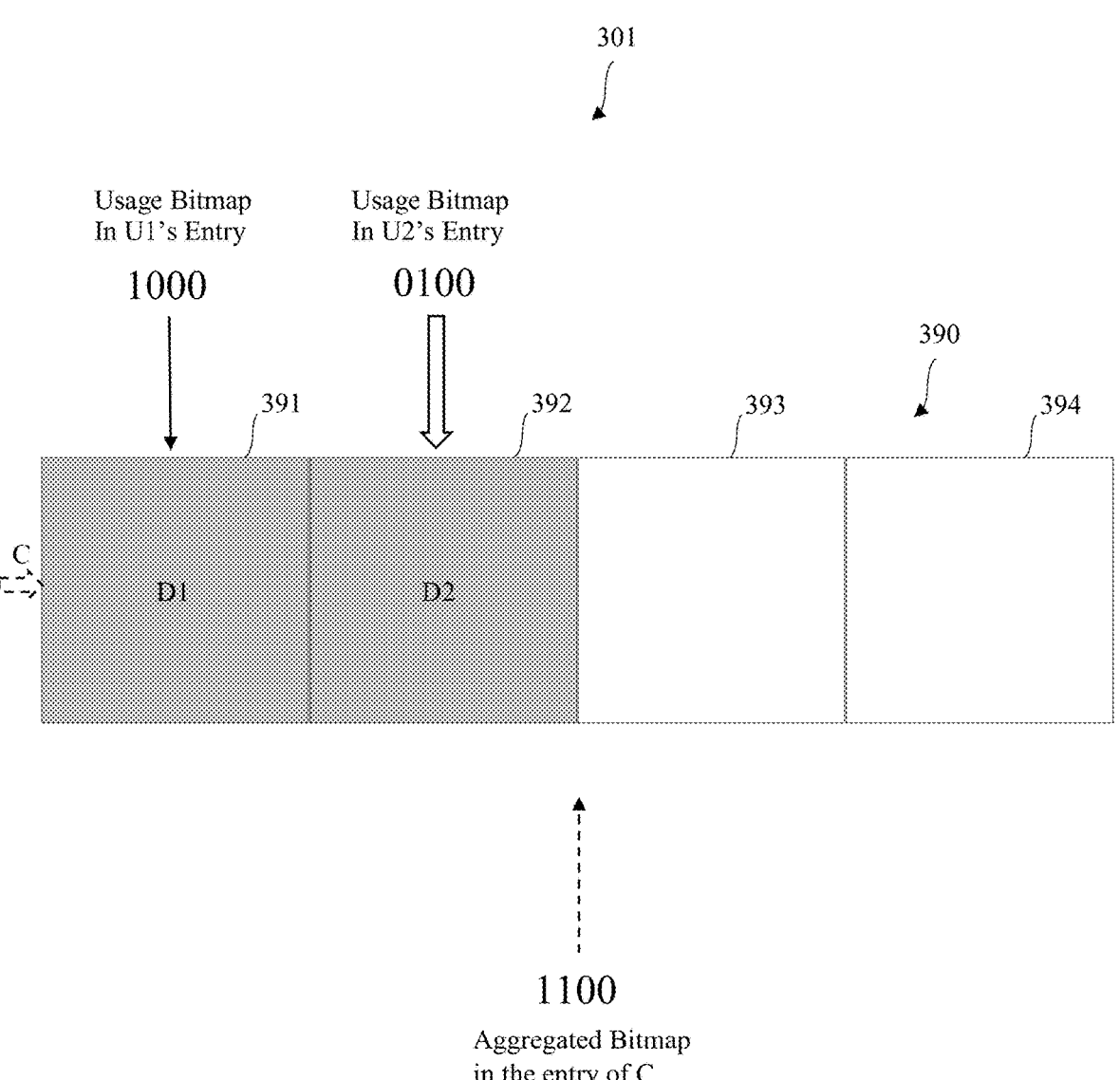
FIG. 3B is a schematic view of an example compressed block, arranged in accordance with at least some embodiments described herein.

FIG. 3B is a schematic view 301 of an example compressed block 390, arranged in accordance with at least some embodiments described herein. In an example embodiment, the block 390 may be a block (e.g., a compressed block) in the block storage device to store the compressed data, and may correspond to a compressed block address.

In an example embodiment, an uncompressed block address U1 may be mapped to the compressed block address C that corresponds to the block 390 in the block storage device. Assuming the uncompressed data corresponding to the uncompressed block address U1 has a size of 4 KB and the compression ratio (a size of the uncompressed data compared with a size of the compressed data) is 4:1, the compressed data D1 to be saved in the compressed block address C may have a size of 1 KB. It is to be understood that the usage of a block and/or blocks on the block storage device (e.g., on a disk, etc.) may be tracked in slivers (e.g., a sub-block, in units of 1 KB, etc.) That is, for the uncompressed data (4 KB) corresponding to the uncompressed block address U1, which is mapped to the compressed block address C using a hash function, the usage bitmap (in the entry of the flat hash table 310 indexed by the uncompressed block address U1) may be "1000", indicating that the first sliver 391 of the block 390 is used by the compressed data D1 (compressed from the uncompressed data (4 KB) corresponding to the uncompressed block address U1), and the remaining three slivers (392, 393, 394) are not used by the compressed data D1.

Similarly, assuming the uncompressed data corresponding to the uncompressed block address U2 has a size of 4 KB and the compression ratio is 4:1, the compressed data D2 to be stored in the compressed block address C may have a size of 1 KB. For the uncompressed data (4 KB) corresponding to the uncompressed block address U2, which may also be mapped to the compressed block address C (since the address C still has free slivers or space) using a hash function, the usage bitmap (in the entry of the flat hash table 310 indexed by the uncompressed block address U2) may be "0100", indicating that the second sliver 392 of the block 390 is used by the compressed data D2 (compressed from the uncompressed data (4 KB) corresponding to the uncompressed block address U2), and the remaining three slivers (391, 393, 394) are not used by the compressed data D2.

That is, the usage bitmap of the entry of the flat hash table 310 may refer to a bitmap tracking the usage of the space (e.g., a block, etc.) that corresponds to the compressed block address for the block storage device. In an example embodiment, the usage of the blocks on the block storage device (e.g., a disk, etc.) may be tracked in slivers. Each bit of the usage bitmap may represent one sliver in the block (that corresponds to the mapped compressed block address) on the block storage device. It is to be understood that the size of a sliver described above is for illustration purpose only and is not limited to the example(s).

The aggregated bitmap (e.g., in an entry of the compressed block allocation table 330 corresponding to the compressed block address C) may track an aggregated usage of the compressed block address C. For example, when two uncompressed block addresses (U1 and U2) are mapped to a same compressed block address C, the aggregated bitmap field of the entry of the compressed block allocation table 330 corresponding to the compressed block address C may be a result of a bitwise "OR" operation of the usage bitmaps for U1 and U2. In the example shown in FIG. 3B, the aggregated bitmap may be "1100", indicating that for block 390, the first and second slivers (391, 392) are aggregately used, and the remaining two slivers (393, 394) are not used and are free to use or be allocated.

It is to be understood that in an example embodiment, for each uncompressed block address (for a 4 KB block), one byte (for the hash function index and the usage bitmap) may be used for an entry of the flat hash table 310, and one bit (for the overflow bit or bitmap) may be used (e.g., for the overflow bit in the entry of the flat hash table 310, or for an overflow bitmap separate from the flat hash table 310). For each compressed block address (for a 4 KB block), 0.5 byte (for the aggregated bitmap) may be used for an entry of the compressed block allocation table 330, and one bit (for the metadata bit or bitmap) may be used (e.g., for the metadata bit in the entry of the compressed block allocation table 330, or for a metadata bitmap separate from the compressed block allocation table 330). Assuming the uncompressed block address space is two times of the compressed block address space, the overall memory usage of the address mapping mechanism (for the tables and/or the bits or bitmaps described in FIG. 3A) described herein may be 1.4375 bytes per a 4 KB uncompressed block address space, or 0.035% of the uncompressed block address space. If the uncompressed block address space is 64 TB, the memory usage for the address mapping mechanism described herein may be 23 GB. It is also to be understood that a flat mapping table scheme may require about 128 GB of memory (or about 0.15%-0.2% of the uncompressed block address space) to manage the same 64 TB space. Features in the embodiments disclosed herein may significantly reduce the memory usage compared with the flat mapping table scheme.

Figure 4:
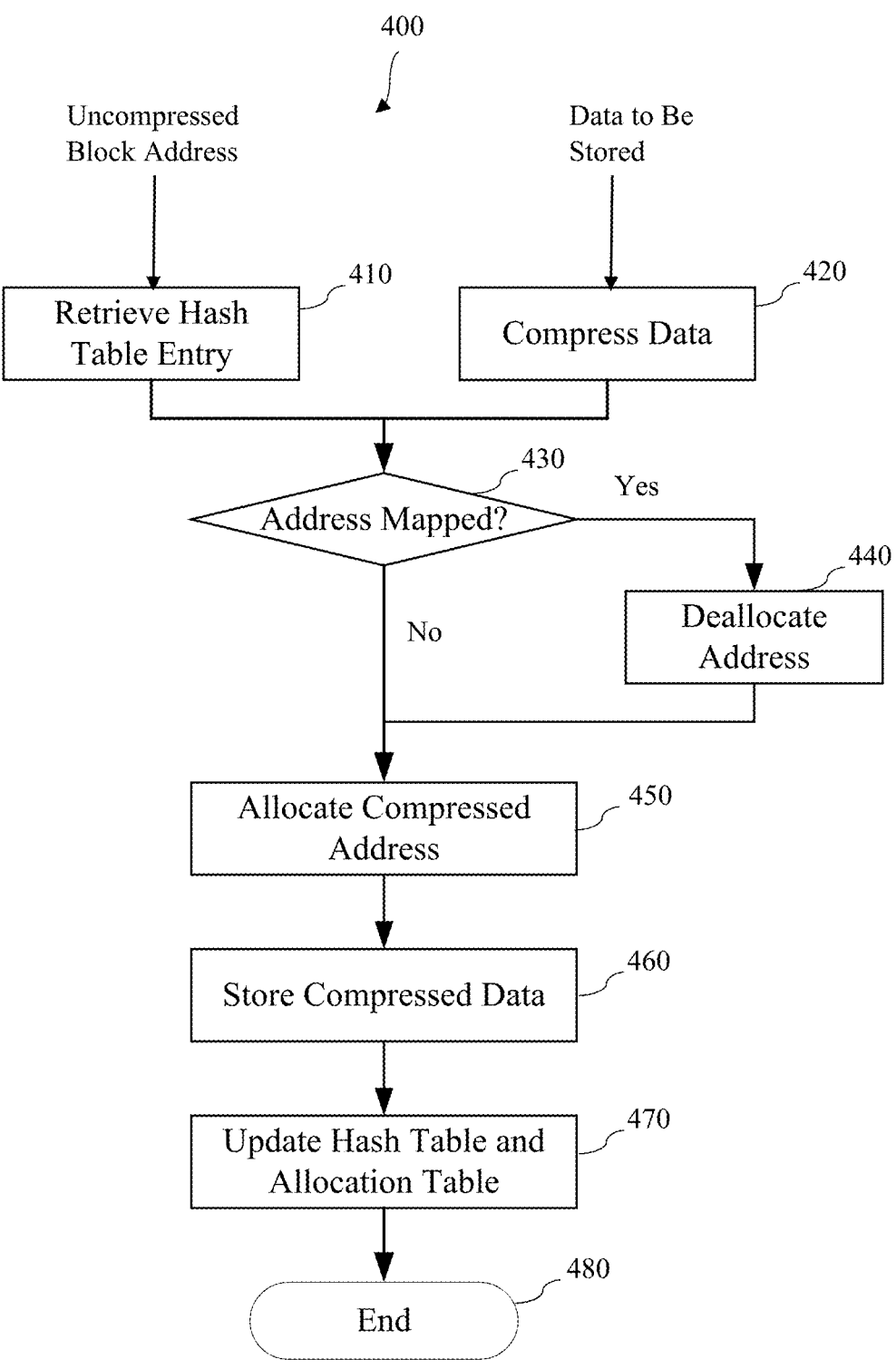
FIG. 4 is a flow chart illustrating an example write processing flow of block device level compression mapping using a flat hash table, in accordance with at least some embodiments described herein.

FIG. 4 is a flow chart illustrating an example write processing flow 400 of block device level compression mapping using a flat hash table, in accordance with at least some embodiments described herein.

Figure 7:
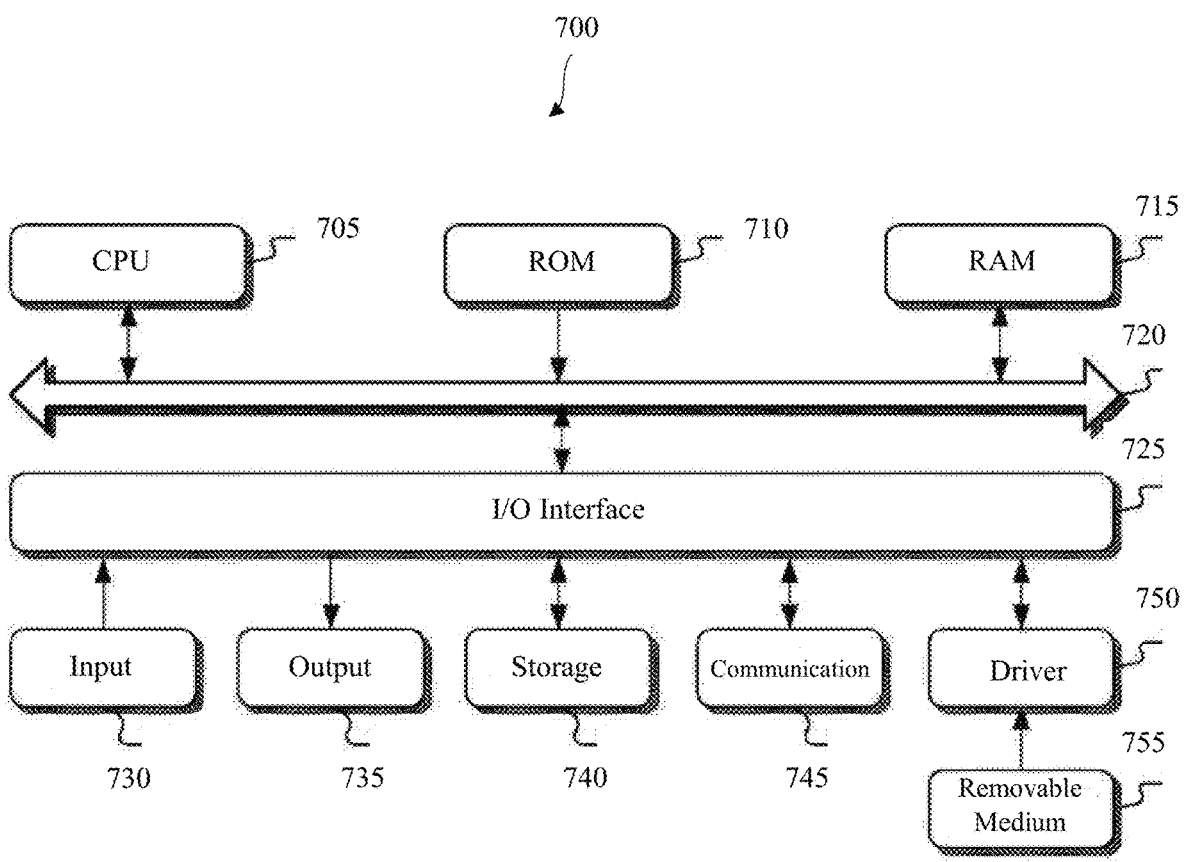
FIG. 7 is a schematic structural diagram of an example computer system applicable to implementing an electronic device, arranged in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, a processor of the block device level compression module 220 of FIG. 2, and/or any other suitable processor), unless otherwise specified.

It is also to be understood that the processing flow 400 can include one or more operations, actions, or functions as illustrated by one or more of blocks 410, 420, 430, 440, 450, 460, 470, and 480. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized, the flat hash table 310 (and/or the overflow bitmap) and the compressed block allocation table 330 (and/or the metadata bitmap) of FIG. 3A may be populated (e.g., from the metadata on the block storage device and/or update journal after power loss) into the memory and/or maintained in memory at runtime, etc. Processing flow 400 may begin at block 410 or block 420. It is also to be understood that the data to be stored or written (the uncompressed data) and/or the uncompressed block address may be received from the host (e.g., the server 150 of FIG. 1). The processing flow 400 may be transparent to the host and/or the application (that requests the write process) that is run on the host.

At block 410 (Retrieve Hash Table Entry), the processor may retrieve or obtain the content of an entry of the flat hash table (e.g., the flat hash table 310 of FIG. 3A) using the uncompressed block address (of the uncompressed data) as the index of the flat hash table to locate the entry. It is to be understood that the uncompressed block address is the address that is presented to or accessible by the host. Each uncompressed block address may correspond to an entry of the flat hash table, which may be indexed using the uncompressed block address.

At block 420 (Compress Data), the processor may compress the data to be stored (the uncompressed data) to compressed data e.g., using a compression algorithm or the like.

It is to be understood that the operations or functions described in block 410 and/or block 420 may be performed or executed in parallel or one after the other. Processing may proceed from block 410 and/or block 420 to block 430.

At block 430 (Address Mapped?), the processor may determine whether the uncompressed block address has been mapped to a compressed block address. The existence of a mapping is indicated by a non-empty or non-zero entry of the flat hash table retrieved or obtained at block 410. An empty or zero entry of the flat hash table may indicate that there is no mapping. It is to be understood that for an empty block storage device (e.g., prepared for its first use), all entries of the flat hash table may be empty (e.g., initialized as zeros, etc.) indicating that no uncompressed block address is mapped to any compressed block address. That is, the hash function index of the entry may be zero (indicating "no mapping"), the usage bitmap of the entry may be zero (indicating no usage of the block(s) in the block storage device), and/or the overflow bit or bitmap may be zero (indicating no overflow, see descriptions of FIGS. 6A and 6B). When the uncompressed block address is not mapped to a compressed block address (e.g., an empty entry of the flat hash table), processing may proceed from block 430 to block 450. When the uncompressed block address is currently mapped to a compressed block address (e.g., non-empty entry), processing may proceed from block 430 to block 440.

At block 440 (Deallocate Address), the processor may deallocate the mapping (which may indicate a used space in the block storage device, and which may be a stale mapping) of the uncompressed block address. In an example embodiment, deallocating the mapping of the uncompressed block address includes (1) locating an entry of the compressed block allocation table (e.g., the compressed block allocation table 330 of FIG. 3A). The entry of the compressed block allocation table is indexed by and may be determined by using the compressed block address mapped from the uncompressed block address by executing the hash function that corresponds to the hash function index in the entry of the flat hash table. Deallocating the mapping of the uncompressed block address also includes (2) updating the aggregated usage bitmap of the entry of an allocation table based on the usage bitmap of the entry of the flat hash table (e.g., by clearing the bit(s) associated with the usage bitmap from the aggregated usage bitmap, etc.), and (3) clearing the hash function index and the usage bitmap of the entry of the flat hash table.

It is to be understood that deallocating the mapping of the uncompressed block address may further include deallocating the linked compressed block address (see descriptions of FIG. 6A) and clearing the overflow bit or bitmap and/or the metadata bit or bitmap, if the tables (the flat hash table and/or the compressed block allocation table) and/or other information indicate that there is a linked compressed block address. Deallocating the mapping of the uncompressed block address may also include deallocating the overflow area or space (see descriptions of FIG. 6B) and clearing the overflow bit or bitmap and/or the metadata bit or bitmap, if the tables (the flat hash table and/or the compressed block allocation table) and/or other information indicate that the overflow area or space is used. Processing may proceed from block 440 to block 450.

At block 450 (Allocate Compressed Address), the processor may allocate a space that corresponds to a compressed block address mapped from the uncompressed block address. In an example embodiment, allocating the space that corresponds to the compressed block address includes executing or performing a set of hash functions (e.g., the set of hash functions in 320 of FIG. 3A) using the uncompressed block address as an input. Allocating the space that corresponds to the compressed block address also includes determining a hash function, among the set of hash functions, so that the hash function has a mapping to a compressed block address with enough free slivers or space in the block storage device for the compressed data. It is to be understood that when there are multiple hash functions (in the set of hash functions) that have a mapping to a compressed block address with enough free slivers or space for the compressed data, the hash function that has the mapping corresponding to the least amount of free slivers or space (e.g., the free space is less than or equal to any space that corresponds to a mapped compressed block address using any one of the set of hash functions other than the hash function, and the free space is sufficient to store the compressed data) among the multiple hash functions may be chosen, e.g., to minimize fragmentation. It is also to be understood that when no hash function has a mapping to a compressed block address with enough free slivers or space for the compressed data (e.g., when the block storage device is almost full), overflow may be handled by the processor. See the descriptions of FIGS. 6A and 6B. Processing may proceed from block 450 to block 460. It is to be understood that once the hash function is determined, the compressed block address can be determined (e.g., by mapping from the uncompressed block address using the determined hash function), and the corresponding free slivers or space may be allocated.

At block 460 (Store Compressed Data), the processor may store or write the compressed data (from block 420) to the mapped compressed block address (allocated or identified at block 450). Processing may proceed from block 460 to block 470.

At block 470 (Update Hash Table and Allocation Table), the processor may update the flat hash table by (1) writing or storing an index of the hash function (in the set of hash functions) that is identified at block 450 to the hash function index of the entry of the flat hash table, and (2) writing or storing the usage bitmap information based on a size of the compressed data (from block 420), where the size of the compressed data may indicate how many slivers or space in the block(s) of the compressed block address may be used by the compressed data. The processor may also update the compressed block allocation table by writing or storing the aggregated bitmap information based on the previous aggregated bitmap information and the usage bitmap information. If there is no previous aggregated bitmap information, the usage bitmap information may be used as the aggregated bitmap. If there is previous aggregated bitmap information, a bitwise "OR" operation of the previous aggregated bitmap information and the usage bitmap information may be performed and the resultant information may be used as the aggregated bitmap. Processing may proceed from block 470 to block 480.

At block 480 (End), the processor may end the write processing flow 400 and/or report to the host that the write process is completed.

Figure 5:
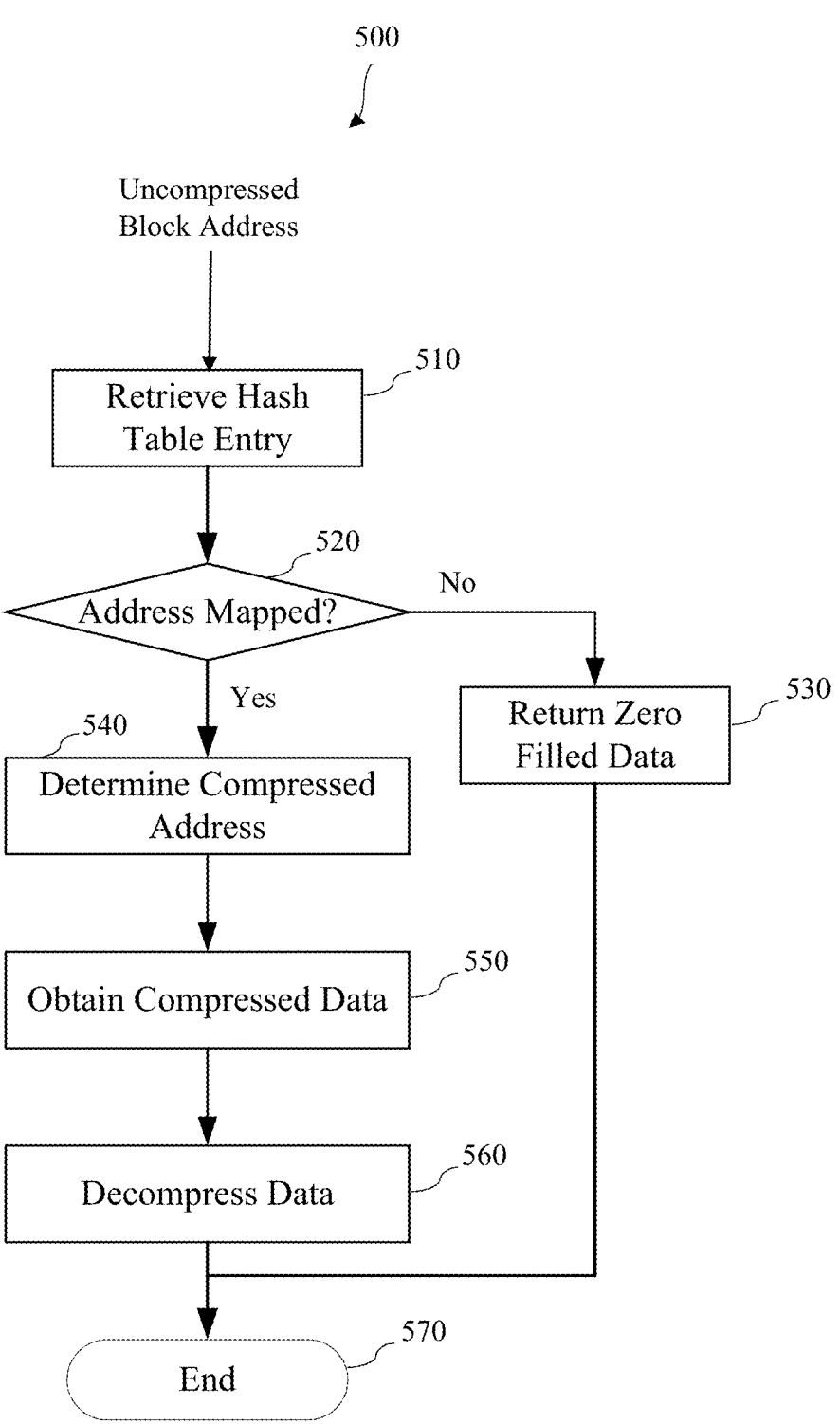
FIG. 5 is a flow chart illustrating an example read processing flow of block device level compression mapping using a flat hash table, in accordance with at least some embodiments described herein.

FIG. 5 is a flow chart illustrating an example read processing flow 500 of block device level compression mapping using a flat hash table, in accordance with at least some embodiments described herein.

It is to be understood that the processing flow 500 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, a processor of the block device level compression module 220 of FIG. 2, and/or any other suitable processor), unless otherwise specified.

It is also to be understood that the processing flow 500 can include one or more operations, actions, or functions as illustrated by one or more of blocks 510, 520, 530, 540, 550, 560, and 570. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized, the flat hash table 310 (and/or the overflow bitmap) and the compressed block allocation table 330 (and/or the metadata bitmap) of FIG. 3A may be populated (e.g., from the metadata on the block storage device and/or update journal after a power loss) into the memory and/or maintained in the memory at runtime, etc. Processing flow 500 may begin at block 510. It is also to be understood that the uncompressed block address may be received from the host (e.g., the server 150 of FIG. 1). The processing flow 500 may be transparent to the host and/or the application (that requests the read process) that is run on the host.

At block 510 (Retrieve Hash Table Entry), the processor may retrieve or obtain the content of an entry of the flat hash table (e.g., the flat hash table 310 of FIG. 3A) using the uncompressed block address as the index of the flat hash table to locate the entry. It is to be understood that the uncompressed block address is the address that presented to, received from, and/or accessible by the host. Each uncompressed block address may correspond to an entry of the flat hash table, which is indexed using the uncompressed block address. Processing may proceed from block 510 to block 520.

At block 520 (Address Mapped?), the processor may determine whether the uncompressed block address has been mapped to a compressed block address. It is to be understood that the existence of a mapping may be indicated by a non-empty or non-zero entry of the flat hash table retrieved or obtained at block 510. An empty or zero entry of the flat hash table may indicate that there is no mapping. That is, the hash function index of the entry may be zero (indicating "no mapping"), the usage bitmap of the entry may be zero (indicating no usage of the block(s) in the block storage device), and/or the overflow bit or bitmap may be zero (indicating no overflow, see descriptions of FIGS. 6A and 6B). When the uncompressed block address is not mapped to a compressed block address (e.g., an empty entry of the flat hash table, or the hash function index is zero in the entry of the hash function table), processing may proceed from block 520 to block 530. When the uncompressed block address is currently mapped to a compressed block address (e.g., non-empty entry), processing may proceed from block 520 to block 540.

At block 530 (Return Zero-Filled Data), the processor may return a zero-filled buffer or data to the host (e.g., to the application (that requests the read process) that is run on the host, etc.), to indicate a read error or the like. Processing may proceed from block 530 to block 570.

At block 540 (Determine Compressed Address), the processor may determine the compressed block address by (1) identifying the hash function in the set of hash functions based on the hash function index in the entry of the flat hash table, and (2) executing the hash function using the uncompressed block address as the input to map the uncompressed block address to a compressed block address (and/or to obtain or generate or determine the compressed block address as the output). Processing may proceed from block 540 to block 550.

At block 550 (Obtain Compressed Data), the processor may obtain, read, or retrieve the compressed data from the space in the block storage device that corresponds to the compressed block address. Processing may proceed from block 550 to block 560.

At block 560 (Decompress Data), the processor may decompress the compressed data from block 550 to uncompressed (or decompressed) data using e.g., a compression/decompression algorithm or the like. Processing may proceed from block 560 to block 570.

At block 570 (End), the processor may end the read processing flow 500 and/or report to the host that the read process is completed by e.g., returning the decompressed data from block 560 or the zero-filled data from block 530 to the host (or to the application that is run on the host, to e.g., indicate an error).

FIG. 6A is a schematic view of an example overflow handling mechanism 600, arranged in accordance with at least some embodiments described herein. FIG. 6B is a schematic view of another example overflow handling mechanism 601, arranged in accordance with at least some embodiments described herein.

It is to be understood that "overflow" may refer to a situation that for an uncompressed block address (of uncompressed data), none of the hash functions in the set of hash functions may find a mapping (to a compressed block address) with enough free slivers or space on the block storage device to store the compressed data (e.g., in the operations at block 450 of FIG. 4). It is also to be understood that when the block storage device (e.g., a disk, a compressed block address space in the disk, etc.) is not very full, overflow may rarely happen since multiple hash functions are executed to find the mapping (see e.g., description of block 450 of FIG. 4). It is further to be understood that when the block storage device is close to full, the probability of overflow may increase.

FIG. 6A shows an example overflow handling mechanism—address linking. In an example embodiment, when the overflow occurs (i.e., none of the hash functions in the set of hash functions may find a mapping (to a compressed block address) with enough free slivers or space to store the compressed data), the hash function that has a mapping (to a compressed block address) with the most free slivers or space may be chosen, and its index may be saved in the entry of the flat hash table. In the write process flow, the processor may split the compressed data into multiple parts (e.g., in a same or variable length), store the split parts in multiple compressed block addresses, and link the split parts together using e.g., link(s). The link(s) may be stored in a metadata area of the block (e.g., provided on the block storage device), or as a part of the (split) compressed data (e.g. in a header of the (split) compressed data).

As shown in FIG. 6A, the compressed data may be split into two or more parts (610A and 620A). In an example embodiment, 610B is the header of the split compressed data 610A and includes a link to the split compressed data 620A (linking to the header 620B). 620B is the header of the split compressed data 620A and includes either (1) a link to the next split compressed data, or (2) a link value indicating that no more split compressed data is linked. In another example embodiment, 610B is the metadata area or space of the block(s) corresponding to the split compressed data 610A and includes a link to the split compressed data 620A (linking to the metadata area or space 620B). 620B is the metadata area or space of the block(s) corresponding of the split compressed data 620A and includes either (1) a link to the next split compressed data, or (2) a link value indicating that no more split compressed data is linked.

FIG. 6B shows another example overflow handling mechanism—overflow area or space. In an example embodiment, the processor may reserve a small portion of the physical space (compressed block address space) for the overflow data, and such portion may be referred to as an overflow area or space. If address linking mechanism fails, the split compressed data may be stored in the overflow area and linked with link(s). When the compressed block is full, the link(s) may be saved in the metadata area of the compressed block.

As shown in FIG. 6B, the compressed data may be split into two or more parts (610A and 690A). In an example embodiment, 610B is the header of the split compressed data 610A and includes a link to the split compressed data 690A (linking to the header 690B). 690B is the header of the split compressed data 690A and includes either (1) a link to the next split compressed data, or (2) a link value indicating that no more split compressed data is linked. In another example embodiment, 610B is the metadata area or space of the block(s) corresponding to the split compressed data 610A and includes a link to the split compressed data 690A (linking to the metadata area or space 690B). 690B is the metadata area or space of the block(s) corresponding of the split compressed data 690A and includes either (1) a link to the next split compressed data, or (2) a link value indicating that no more split compressed data is linked. It is to be understood that 690A and 690B are stored in the overflow area or space specifically reserved for the overflow data.

It is also to be understood that if both the address linking mechanism and the overflow area mechanism fail, the write request/process fails and the processor reports an error indicating "disk full" to the host (or to the application that requests the write process).

It is further to be understood that when overflow occurs, in the write process, the overflow bit or bitmap may be updated to indicate the overflow. If the compressed block address has metadata (e.g., that includes the link(s) to the next split compressed data, etc.), in the write process, the metadata bit or bitmap may be updated to indicate that the compressed block address has metadata. Accordingly, in the write process, when deallocating the address (in block 440 of FIG. 4), the area or space having the split compressed data (and/or its header or metadata) may be deallocated based on the overflow bit or bitmap and/or the metadata bit or bitmap (and/or the header or metadata of the split compressed data). Accordingly, in the read process, when reading the compressed data (e.g., at block 550 of FIG. 5), the overflow bit or bitmap and/or the metadata bit or bitmap (and/or the header or metadata of the split compressed data) may be checked to ensure that all the split compressed data are read.

In an example embodiment, the processor may perform power loss protection to protect the integrity of the block device level compression mapping process. For example, the flat hash table, the overflow bit or bitmap, and/or the metadata bit or bitmap need to be persistent so that during or after a power loss, the processor may preserve the status of the mapping and/or restore the correct mappings on next startup. It is to be understood that the aggregated bitmap in the compressed block allocation table may be derived from the flat hash table, and thus the allocation table do not need to be persistent.

In an example embodiment, an "update journal" may be used for recording the updates to the flat hash table, the overflow bit or bitmap, and/or the metadata bit or bitmap. The update journal may be power loss protected (e.g. by using a capacitor on the block device level compression module or computer card). Whenever the flat hash table, the overflow bit or bitmap, and/or the metadata bit or bitmap is updated, the event is recorded in the "update journal". When the "update journal" becomes full or near full (e.g., the usage of the update journal is above a certain threshold), the current snapshot of the flat hash table, the overflow bit or bitmap, and/or the metadata bit or bitmap may be written to or backed-up in the block storage device (e.g., a disk, etc.) to free up entries in the "update journal". The backup process may be performed in a progressive manner to minimize the impact on user's inputs/outputs. In the event of power loss, the mapping may be restored at the next power on by e.g., (1) reading or retrieving the snapshot of the flat hash table, the overflow bit or bitmap, and/or the metadata bit or bitmap from the block storage device (e.g., the disk, etc.), and (2) replaying the events recorded in the "update journal" to restore the latest state of the flat hash table, the overflow bit or bitmap, and/or the metadata bit or bitmap.

FIG. 7 is a schematic structural diagram of an example computer system 700 applicable to implementing an electronic device (for example, the server or one of the terminal devices shown in FIG. 1), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 714 may also store various data and programs required for operations of the system 700. The CPU 705, the ROM 710, and the RAM 720 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

It is to be understood that the processes described with reference to the flowcharts of FIGS. 4-5 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 745, and/or may be installed from the removable medium 755. The computer program, when being executed by the central processing unit (CPU) 705, can implement the above functions specified in the method in the embodiments disclosed herein.

Features in the embodiments disclosed herein provide a hybrid design of transparent block (storage) device level compression mapping using a flat hash table. A flat hash table may be used to track the critical information of each uncompressed block address in memory, so that for most of the input/output requests, there is no need to read the critical information from the disk (e.g., the block storage device). Instead of storing the compressed block address, a 4-bit index of the hash function for each uncompressed block address may be stored in the flat hash table. The index may indicate which hash function is used for mapping the uncompressed block address. As such, the memory usage may be lowered by almost a magnitude compared with existing schemes, making the block device level compression mapping scheme cost effective and feasible for production. In the schemes disclosed herein, an uncompressed block address may be mapped to a compressed block address using the hash function indicated by the hash index in the flat hash table entry. Since the uncompressed block address space is larger than the compressed block address space, multiple uncompressed block addresses may be mapped to a same compressed block address.

Features in the embodiments disclosed herein may provide better performance than other existing schemes. The flat hash table may provide precise or near precise mapping for a given uncompressed block address, eliminating the need for multiple attempts to map the uncompressed block address to a compressed block address. As such, there may be no extra latency for most of the inputs/outputs, e.g., during reading and/or writing. Features in the embodiments disclosed herein may also require less cost than other existing schemes. There is no need to require a large dynamic random-access memory (DRAM) for the mapping table. The flat hash table is about 0.03% of the uncompressed address space, almost a magnitude lower than any existing schemes. For example, about 23 GB of DRAM for managing 64 TB of uncompressed space may be needed for the block device level compression mapping scheme, while 128 GB of memory may be required for the existing schemes. Features in the embodiments disclosed herein may further provide less complexity than other existing schemes. Critical information management may be simplified when using the flat hash table. Also, features in the embodiments disclosed herein may provide better scalability than other existing schemes. The performance of the block device level compression mapping design may only be limited by the fullness of the disks (e.g., the block storage devices) instead of their capacity.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method for block device level compression mapping using a flat hash table having a plurality of entries, each entry of the flat hash table including a hash function index and a usage bitmap, the method comprising: compressing uncompressed data to compressed data; retrieving an entry of the flat hash table using an uncompressed block address of the uncompressed data; determining a compressed block address of the compressed data by: executing at least one hash function for mapping the uncompressed block address to the compressed block address, and determining a hash function in the at least one hash function for mapping the uncompressed block address to the compressed block address that corresponds to a space in a block storage device to store the compressed data; storing the compressed data to the space that corresponds to the compressed block address; and updating the hash function index of the entry of the flat hash table with an index indicative of the hash function.

Aspect 2. The method of aspect 1, wherein the at least one hash function includes two or more hash functions, the space is greater than or equal to a size of the compressed data, and the space is less than or equal to any space that corresponds to a mapped compressed block address using any one of the at least one hash function other than the hash function.

Aspect 3. The method of aspect 1 or aspect 2, further comprising: determining a usage of the space; and updating the usage bitmap of the entry of the flat hash table based on the determined usage.

Aspect 4. The method of any one of aspects 1-3, further comprising: determining an aggregated usage of the space; and updating an aggregated usage bitmap of an entry of an allocation table based on the determined aggregated usage.

Aspect 5. The method of any one of aspects 1-4, further comprising: when the entry of the flat hash table is not empty, deallocating a used space.

Aspect 6. The method of aspect 5, wherein deallocating the used space includes: locating an entry of an allocation table based on the entry of the flat hash table; updating an aggregated usage bitmap of the entry of an allocation table based on the usage bitmap of the entry of the flat hash table; clearing the hash function index and the usage bitmap of the entry of the flat hash table.

Aspect 7. The method of aspect 6, wherein the flat hash table further includes an overflow bitmap, wherein deallocating the used space further includes: deallocating a linked compressed block address; and clearing the overflow bitmap of the entry of the flat hash table.

Aspect 8. The method of aspect 6, wherein the flat hash table further includes an overflow bitmap, wherein deallocating the used space further includes: deallocating an overflow space; and clearing the overflow bitmap of the entry of the flat hash table.

Aspect 9. The method of aspect 6, wherein deallocating the used space further includes: clearing a metadata bitmap of the entry of the allocation table.

Aspect 10. The method of any one of aspects 1-9, further comprising: retrieving the entry of the flat hash table using the uncompressed block address; determining the hash function that corresponds to the hash function index of the entry of the flat hash table; mapping the uncompressed block address to the compressed block address using the hash function; obtaining the compressed data using the compressed block address; and decompressing the compressed data to the uncompressed data.

Aspect 11. The method of aspect 10, further comprising: when the hash function index of the entry of the flat hash table is empty, returning a zero-filled buffer.

Aspect 12. The method of any one of aspects 1-11, wherein the flat hash table further includes an overflow bitmap, the method further comprising: when the space is less than a size of the compressed data, splitting the compressed data; storing the split compressed data in multiple compressed block addresses; linking the split compressed data using a link; and updating the overflow bitmap of the entry of the flat hash table.

Aspect 13. The method of aspect 12, further comprising: storing the link in a metadata space; and updating a metadata bitmap of an entry of an allocation table.

Aspect 14. The method of any one of aspects 1-13, wherein the flat hash table further includes an overflow bitmap, the method further comprising: when the space is less than a size of the compressed data, storing the compressed data in an overflow space; and updating the overflow bitmap of the entry of the flat hash table.

Aspect 15. The method of any one of aspects 1-14, further comprising: generating a snapshot of the flat hash table; and storing the snapshot in the block storage device.

Aspect 16. The method of aspect 15, further comprising: retrieving the snapshot of the flat hash table; and restoring the flat hash table.

Aspect 17. A block storage device control system, the system comprising: a flat hash table having a plurality of entries, each entry of the flat hash table including a hash function index and a usage bitmap; a processor to: compress uncompressed data to compressed data; retrieve an entry of the flat hash table using an uncompressed block address of the uncompressed data; determine a compressed block address of the compressed data by: executing at least one hash function for mapping the uncompressed block address to the compressed block address, and determining a hash function in the at least one hash function for mapping the uncompressed block address to the compressed block address that corresponds to a space in a block storage device to store the compressed data; store the compressed data to the space that corresponds to the compressed block address; and update the hash function index of the entry of the flat hash table with an index indicative of the hash function.

Aspect 18. The system of aspect 17, wherein the processor is to further: retrieve the entry of the flat hash table using the uncompressed block address; determine the hash function that corresponds to the hash function index of the entry of the flat hash table; map the uncompressed block address to the compressed block address using the hash function; obtain the compressed data using the compressed block address; and decompress the compressed data to the uncompressed data.

Aspect 19. The system of aspect 17 or aspect 18, wherein the processor is to further: deallocate a used space when the entry of the flat hash table is not empty.

Aspect 20. A non-transitory computer-readable medium having computer-executable instructions stored thereon that, upon execution, cause one or more processors to perform operations comprising: compressing uncompressed data to compressed data; retrieving an entry of a flat hash table using an uncompressed block address of the uncompressed data; determining a compressed block address of the compressed data by: executing at least one hash function for mapping the uncompressed block address to the compressed block address, and determining a hash function in the at least one hash function for mapping the uncompressed block address to the compressed block address that corresponds to a space in a block storage device to store the compressed data; storing the compressed data to the space that corresponds to the compressed block address; and updating a hash function index of the entry of the flat hash table with an index indicative of the hash function.

Aspect 21. The computer-readable medium of aspect 20, wherein the operations further comprise: determining a usage of the space; and updating a usage bitmap of the entry of the flat hash table based on the determined usage.

Aspect 22. The computer-readable medium of aspect 20 or aspect 21, wherein the flat hash table further includes an overflow bitmap, wherein the operations further comprise: when the space is less than a size of the compressed data, splitting the compressed data; storing the split compressed data in multiple compressed block addresses; linking the split compressed data using a link; and updating the overflow bitmap of the entry of the flat hash table.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for block device level compression mapping using a flat hash table having a plurality of entries, each entry of the flat hash table including a hash function index and a usage bitmap, the method comprising:
    compressing uncompressed data to compressed data;
    retrieving an entry of the flat hash table using an uncompressed block address of the uncompressed data;
    mapping the uncompressed block address of the uncompressed data to a compressed block address of the compressed data by:
        executing two or more hash functions to map the uncompressed block address to two or more candidate compressed block addresses;
        identifying two or more spaces in a block storage device to store the compressed data, each space of the two or more spaces corresponding to the two or more candidate compressed block addresses, each space representing one or more unused slivers at the corresponding block addresses, wherein at least one of the corresponding block addresses comprises one or more occupied slivers; and
        selecting a particular space that comprises the fewest number of unused slivers of the two or more spaces and is greater than or equal to a size of the compressed data and selecting the corresponding candidate compressed block address as the compressed block address;
    storing the compressed data to the particular space that corresponds to the compressed block address; and
    updating the hash function index of the entry of the flat hash table with an index indicative of the hash function corresponding to the compressed block address.

2. The method of claim 1, further comprising:
    determining a usage of the particular space; and
    updating the usage bitmap of the entry of the flat hash table based on the determined usage.

3. The method of claim 1, further comprising:
    determining an aggregated usage of the particular space; and
    updating an aggregated usage bitmap of an entry of an allocation table based on the determined aggregated usage.

4. The method of claim 1, further comprising:
    in response to determining that the entry of the flat hash table is not empty, deallocating a used space.

5. The method of claim 4, wherein deallocating the used space includes:
    locating an entry of an allocation table based on the entry of the flat hash table;
    updating an aggregated usage bitmap of the entry of an allocation table based on the usage bitmap of the entry of the flat hash table; and
    clearing the hash function index and the usage bitmap of the entry of the flat hash table.

6. The method of claim 5, wherein the flat hash table further includes an overflow bitmap, wherein deallocating the used space further includes:
    deallocating a linked compressed block address; and
    clearing the overflow bitmap of the entry of the flat hash table.

7. The method of claim 5, wherein the flat hash table further includes an overflow bitmap, wherein deallocating the used space further includes:
    deallocating an overflow space; and
    clearing the overflow bitmap of the entry of the flat hash table.

8. The method of claim 5, wherein deallocating the used space further includes:
    clearing a metadata bitmap of the entry of the allocation table.

9. The method of claim 1, further comprising:
    retrieving the entry of the flat hash table using the uncompressed block address;
    determining the hash function that corresponds to the hash function index of the entry of the flat hash table;
    mapping the uncompressed block address to the compressed block address using the hash function;
    obtaining the compressed data using the compressed block address; and
    decompressing the compressed data to the uncompressed data.

10. The method of claim 9, further comprising:

in response to determining that the hash function index of the retrieved entry of the flat hash table is empty, returning a zero-filled buffer.

11. The method of claim 1, wherein the flat hash table further includes an overflow bitmap, the method further comprising:

when the identified two or more spaces are less than a size of the compressed data, splitting the compressed data;

storing the split compressed data in multiple compressed block addresses;

linking the split compressed data using a link; and updating the overflow bitmap of the entry of the flat hash table.

12. The method of claim 11, further comprising:

storing the link in a metadata space; and updating a metadata bitmap of an entry of an allocation table.

13. The method of claim 1, wherein the flat hash table further includes an overflow bitmap, the method further comprising:

when the identified two or more spaces are less than a size of the compressed data, storing the compressed data in an overflow space; and updating the overflow bitmap of the entry of the flat hash table.

14. A block storage device control system, the system comprising:

a flat hash table having a plurality of entries, each entry of the flat hash table including a hash function index and a usage bitmap;

a processor to:

compress uncompressed data to compressed data;

retrieve an entry of the flat hash table using an uncompressed block address of the uncompressed data;

map the uncompressed block address of the uncompressed data to a compressed block address of the compressed data by:

executing two or more hash function to map the uncompressed block address to two or more candidate compressed block addresses;

identifying two or more spaces in a block storage device to store the compressed data, each space of the two or more spaces corresponding to the two or more candidate compressed block addresses, each space representing one or more unused slivers at the corresponding block addresses, wherein at least one of the corresponding block addresses comprises one or more occupied slivers; and selecting a particular space that comprises the fewest number of unused slivers of the two or more spaces and is greater than or equal to a size of the compressed data and selecting the corresponding candidate compressed block address as the compressed block address;

store the compressed data to the particular space that corresponds to the compressed block address; and update the hash function index of the entry of the flat hash table with an index indicative of the hash function corresponding to the compressed block address.

15. The system of claim 14, wherein the processor is to further:

retrieve the entry of the flat hash table using the uncompressed block address;

determine the hash function that corresponds to the hash function index of the entry of the flat hash table;

map the uncompressed block address to the compressed block address using the hash function;

obtain the compressed data using the compressed block address; and decompress the compressed data to the uncompressed data.

16. The system of claim 14, wherein the processor is to further:

deallocate a used space in response to the entry of the flat hash table being not empty.

17. A non-transitory computer-readable medium having computer-executable instructions stored thereon that, upon execution, cause one or more processors to perform operations comprising:

compressing uncompressed data to compressed data;

retrieving an entry of a flat hash table using an uncompressed block address of the uncompressed data;

mapping the uncompressed block address of the uncompressed data to a compressed block address of the compressed data by:

executing two or more hash functions to map the uncompressed block address to two or more candidate compressed block addresses;

identifying two or more spaces in a block storage device to store the compressed data, each space of the two or more spaces corresponding to the two or more candidate compressed block addresses, each space representing one or more unused slivers at the corresponding block addresses, wherein at least one of the corresponding block addresses comprises one or more occupied slivers; and selecting a particular space that comprises the fewest number of unused slivers of the two or more spaces and is greater than or equal to a size of the compressed data and selecting the corresponding candidate compressed block address as the compressed block address;

storing the compressed data to the particular space that corresponds to the compressed block address; and updating a hash function index of the entry of the flat hash table with an index indicative of the hash function corresponding to the compressed block address.

18. The computer-readable medium of claim 17, wherein the operations further comprise:

determining a usage of the particular space; and updating a usage bitmap of the entry of the flat hash table based on the determined usage.

19. The computer-readable medium of claim 17, wherein the flat hash table further includes an overflow bitmap, wherein the operations further comprise:

when the identified two or more spaces are less than a size of the compressed data, splitting the compressed data;

storing the split compressed data in multiple compressed block addresses;

linking the split compressed data using a link; and updating the overflow bitmap of the entry of the flat hash table.

* * * * *